US008826269B2

(12) United States Patent
Li et al.

(10) Patent No.: US 8,826,269 B2
(45) Date of Patent: Sep. 2, 2014

(54) ANNOTATING VIRTUAL APPLICATION PROCESSES

(75) Inventors: Hui Li, Malden, MA (US); John M. Sheehan, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 12/484,267

(22) Filed: Jun. 15, 2009

(65) Prior Publication Data
US 2010/0318997 A1   Dec. 16, 2010

(51) Int. Cl.
G06F 9/46      (2006.01)
G06F 9/455     (2006.01)
G06F 3/00      (2006.01)
H04L 29/06     (2006.01)
H04L 9/32      (2006.01)
G06F 7/04      (2006.01)

(52) U.S. Cl.
CPC .. *G06F 9/45558* (2013.01); *G06F 2009/45579* (2013.01)
USPC ............... 718/1; 718/100; 719/328; 719/330; 719/331; 713/159; 713/172; 726/20

(58) Field of Classification Search
None
See application file for complete search history.

(56) References Cited

U.S. PATENT DOCUMENTS

| | | | |
|---|---|---|---|
| 6,279,111 B1 | 8/2001 | Jensenworth et al. | |
| 6,496,864 B1 | 12/2002 | McCartney | |
| 6,505,300 B2 | 1/2003 | Chan et al. | |
| 7,454,748 B2 * | 11/2008 | Ari-Pekka et al. | 717/174 |
| 7,962,545 B2 | 6/2011 | Knauerhase | |
| 2004/0128670 A1 * | 7/2004 | Robinson et al. | 718/1 |
| 2005/0076326 A1 * | 4/2005 | McMillan et al. | 717/100 |
| 2005/0091655 A1 | 4/2005 | Probert et al. | |
| 2006/0075381 A1 * | 4/2006 | Laborczfalvi et al. | 717/100 |
| 2006/0136910 A1 * | 6/2006 | Brickell et al. | 718/1 |
| 2006/0174334 A1 * | 8/2006 | Perlin et al. | 726/9 |
| 2007/0050854 A1 * | 3/2007 | Cooperstein et al. | 726/30 |
| 2007/0067255 A1 | 3/2007 | Bissett et al. | |
| 2007/0074192 A1 * | 3/2007 | Geisinger | 717/148 |

(Continued)

FOREIGN PATENT DOCUMENTS

CN     1761944 A    4/2006
CN   101231731 A    7/2008

OTHER PUBLICATIONS

Application Virtualization—A Whitepaper; Interra Information technology; Jan. 3, 2010; 7 pages.*

(Continued)

*Primary Examiner* — Abdullah Al Kawsar
(74) *Attorney, Agent, or Firm* — Jim Sfekas; Kate Drakos; Micky Minhas

(57) ABSTRACT

A virtualization system is described herein that facilitates communication between a virtualized application and a host operating system to allow the application to correctly access resources referenced by the application. When the operating system creates a virtualized application process, the virtualization system annotates a data structure associated with the process with an identifier that identifies the virtualized application environment associated with the process. When operating system components make requests on behalf of the originating virtual process, a virtualization driver checks the data structure associated with the process to determine that the helper process is doing work on behalf of the virtualized application process. Upon discovering that the thread is doing virtual process work, the virtualization driver directs the helper process's thread to the virtual application's resources, allowing the helper process to accomplish the requested work with the correct data.

17 Claims, 4 Drawing Sheets

(56) References Cited

U.S. PATENT DOCUMENTS

| | | | |
|---|---|---|---|
| 2007/0094667 | A1 | 4/2007 | Bissett et al. |
| 2007/0204265 | A1 | 8/2007 | Oshins |
| 2008/0250222 | A1 | 10/2008 | Gokhale et al. |
| 2009/0037923 | A1 | 2/2009 | Smith et al. |
| 2010/0257578 | A1* | 10/2010 | Shukla et al. ............ 726/1 |
| 2010/0306764 | A1* | 12/2010 | Khanna ............ 718/1 |
| 2011/0145565 | A1* | 6/2011 | Kol et al. ............ 713/155 |

OTHER PUBLICATIONS

"The Architecture of VMware ESX Server 3iWHITE", Retrieved at<<http://www.vmware.com/files/pdf/ESXServer3i_architecture.pdf>>, pp. 1-10, 2007.

"What is a Token", Retrieved at<<http://alt.pluralsight.com/wiki/default.aspx/Keith.GuideBook/WhatIsAToken.html>>, pp. 3, Oct. 21, 2004.

Restrepo, et al."Adjusting Process Token Privileges", Retrieved at<<http://winterdom.com/dev/security/tokens.html>>, pp. 3, Retrived on Apr. 8, 2009.

Chinese Patent Application No. 201080027468.X, voluntary claim amendments filed on Aug. 7, 2013 , 10 pages, including English translation.

Chinese Patent Application No. 201080027468.X, Office Action dated Sep. 5, 2013 , 10 pages, including English translation.

Chinese Patent Application No. 201080027468.X, First Office Action dated Sep. 20, 2012, 10 pages including English translation.

Chinese Patent Application No. 201080027468.X, Response to Office Action, dated Feb. 4, 2013, 12 pages, including English translation of claims.

Chinese Patent Application No. 201080027468.X, Second Office Action dated Mar. 5, 2013, 6 pages including English translation.

Chinese Patent Application No. 201080027468.X, Response to Second Office Action dated Mar. 18, 2013, 2 pages.

Chinese Patent Application No. 201080027468.X, Third Office Action dated May 9, 2013, 6 pages, including English translation.

European Patent Application No. 10789970.0, Extended European Search Report dated Nov. 20, 2012, 7 pages.

English Translation of Abstract of CN101231731, 1 page, Published Jul. 30, 2008.

Chinese Patent Application No. 201080027468.X, English language Summary of Fourth Office Action dated Sep. 5, 2013, 1 page.

Chinese Patent Application No. 201080027468.X, Amendment to Office Action dated Nov. 18, 2013 , 11 pages, including English translation of amended claims.

Chinese Patent Application No. 201080027468.X, Notice of Grant dated Jan. 15, 2014, 4 pages including English translation.

European Patent Application No. 10 789 970.0, Response dated May 29, 2013, 9 pages.

"International Search Report", Mailed Date: Dec. 22, 2010, Application No. PCT/US2010/038223, Filed Date: Jun. 10, 2010, pp. 11.

* cited by examiner

ANNOTATING VIRTUAL APPLICATION PROCESSES

BACKGROUND

In computer science, a virtual machine is a software implementation of a machine (computer) that executes programs like real physical hardware. System virtual machines (sometimes called hardware virtual machines) allow the sharing of the underlying physical machine resources between different virtual machines, each running its own operating system. The software layer that executes one or more virtual machines is called a virtual machine monitor or hypervisor. A hypervisor can run on bare hardware (Type 1 or native virtual machine) or on top of an operating system (Type 2 or hosted virtual machine). Some advantages of system virtual machines are: multiple operating system environments can co-exist on the same computer, in strong isolation from each other; the virtual machine can provide an instruction set architecture that is somewhat different from that of the real machine; and administrators can consolidate underutilized servers by running multiple virtual machines on one physical computer system. Multiple virtual machines each running their own operating system (called a guest operating system) are frequently used in server consolidation, where different services that used to run on individual machines in order to avoid interference are instead run in separate virtual machines on the same physical machine.

Running multiple operating systems allows time-sharing a single computer between several single-tasking operating systems. This technique includes a process to share the CPU resources between guest operating systems and memory virtualization to share the memory on the host. The guest operating systems do not have to all be the same, making it possible to run different operating systems on the same computer (e.g., Microsoft Windows™ and Linux, or older versions of an operating system in order to support software that has not yet been ported to the latest operating system version). The use of virtual machines to support different guest operating systems is also sometimes used in embedded systems. One use is to support a real-time operating system at the same time as a high-level operating system such as Linux or Windows™. Another use of virtual machines is to execute an operating system that is not trusted in a "sandbox." Virtual machines can also provide other advantages for operating system development, including improved debugging access and faster reboots.

Application virtualization is a technique that provides a virtual environment at the application level. For example, a host operating system may natively run some applications, while providing a virtual environment for running others (i.e., virtualized applications). Unlike the machine-level virtualization described above where an entire machine is virtualized in a way that allows running an operating system, application virtualization provides a virtual environment sufficient to run a single application or multiple applications. This may allow the operating system, for example, to run applications inherently conflicting with each other. Application virtualization blurs a distinction for the user between applications running natively in the host operating system and applications running in a virtual environment. For example, both types of applications may appear side by side in a taskbar or menu provided by the operating system shell.

Although virtualized applications may appear similar to native applications to a user, resources expected or required by the virtualized application may not be installed on the host operating system. For example, files, registry keys, configuration settings, and other resources may be unavailable or stored in a different location than that presented to the application by the virtual environment. In some cases, the virtualized application includes a package or other object in an archive format that contains the resources expected by the virtualized application. It can be difficult to ensure that the application can find resources that are not installed locally so that the application will run correctly and remain unaware of the virtualized environment. A class of resource requests may originate in operating system code that is called within a process of the virtual application. These requests may be marshaled and provided to a helper process that is outside of the virtual environment. This helper process may make requests to the host operating system on behalf of one or more virtual processes. For the helper process to do its work correctly, it may need to access the resources in a location established by the virtual environment.

SUMMARY

A virtualization system is described herein that facilitates communication between a virtualized application and a host operating system to allow the application to correctly access resources referenced by the application. When the operating system creates a process for a virtualized application, the virtualization system annotates a data structure associated with the process with an identifier that identifies the virtual application environment associated with the process. When operating system components make requests on behalf of the virtual process through a helper process, a virtualization driver that receives the requests checks the data structure associated with the process to determine whether the helper process is doing work on behalf of the virtualized application process. Upon discovering that the helper process's thread is doing work on behalf of a virtual process, the virtualization driver directs the request of the helper process's thread to the virtual application's resources, allowing the helper process to accomplish the work requested with the correct data. Thus, the virtualization system facilitates application virtualization for applications that use resources contained within a virtual application environment (i.e., virtualized resources).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
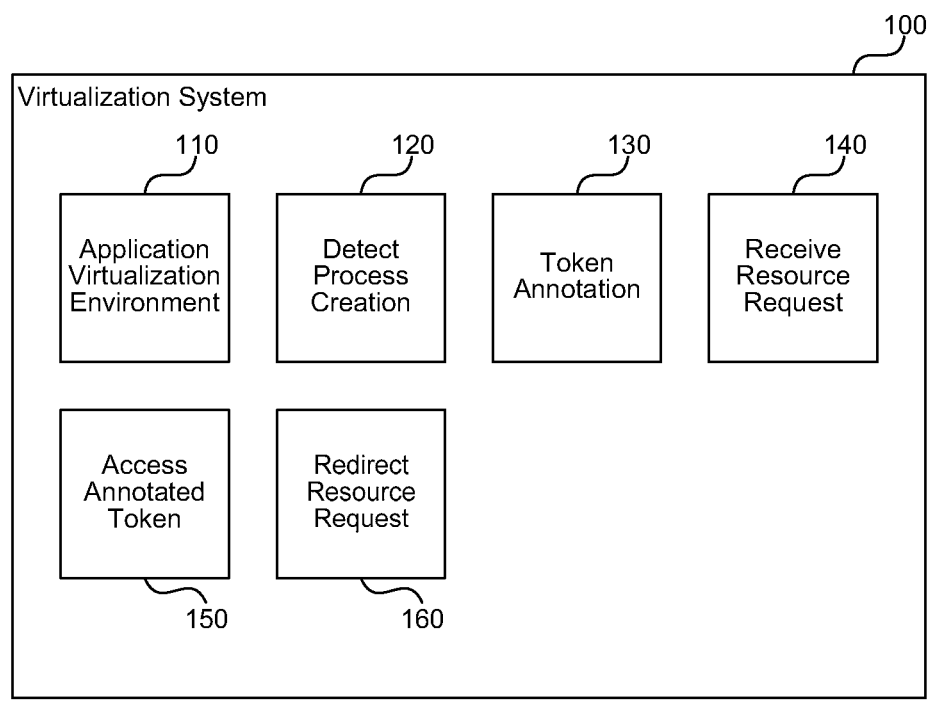
FIG. 1 is a block diagram that illustrates components of the virtualization system, in one embodiment.

A virtualization system is described herein that facilitates communication between a virtualized application and a host operating system to allow the application to correctly access resources referenced by the application. In some embodiments, the virtualization system annotates a virtual process to identify the process such that the host operating system can correctly redirect any helper process requests to virtualized resources. When the operating system creates a virtualized application process (e.g., in response to a user invoking the application from the operating system shell), the virtualization system annotates a data structure associated with the process (e.g., a token) with an identifier that identifies the virtual application environment associated with the process. When operating system components (e.g., a helper process) make requests on behalf of the originating virtual process, a virtualization driver checks the data structure associated with the executing thread to determine that the helper process's thread is doing work on behalf of the virtualized application process. Upon discovering that the thread is doing virtual process work, the virtualization driver directs the helper process's thread to the virtual application's resources, allowing the helper process to accomplish the work requested with the correct data. In some embodiments, the virtualization system selects a field in the process data structure that is automatically replicated by the operating system to impersonating processes and child processes, so that when the helper process performs work on behalf of the virtualized application process, the helper process's thread will be marked with the identifier that identifies the originating virtual application environment. Thus, the virtualization system facilitates application virtualization for applications that use virtualized resources.

Operating systems have security principles to control access to resources like files. For example, when using Microsoft Windows™ NT™, a token is a security principle that every process has. Threads may also have tokens when they impersonate users other than that of the thread's process. Among other things, a token includes a number of security identifiers (SIDs) that identify a user that launched the process and groups to which the user belongs. A security subsystem uses the SIDs in combination with access control lists (ACLs), which describe the users that can access a resource, to determine whether the user has access rights to a particular resource (e.g., a file or registry key). For example, by default the token of a non-administrative user running Microsoft Windows™ Explorer™ does not have the correct SIDs attached to the token to allow the user to write to the core operating system file c:\windows\system32\ntoskrnl.exe. UNIX has a similar concept, called groupid.

One aspect of application virtualization includes modifying process requests to the operating system to fool the application/process into thinking the application is installed locally, when in fact its data and state is located in a separate store. For example, the virtualized application may include a package or designated directory where the application's data is stored. In some embodiments, the virtualization system includes a kernel mode driver that intercepts namespace resource requests, such as file or registry opens, and modifies the requests to refer to the correct location (e.g., in the application's separate store). For example, one type of modification could be to redirect an open from the path "c:\windows\winsxs\filedir1" to "Q:\app\vfs\windows\winsxs\filedir1." Doing this allows the application to find its data while not changing the local system by putting the folder containing the application's data on the local machine.

Certain requests do not come into the kernel in clear form. These requests use Local Procedure Calls (LPC) to communicate a request to a helper operating system process. An example of this is Microsoft Windows™ Side-By-Side (S×S). Using S×S an originating process opens a particular version of an assembly from a side-by-side assembly cache that contains potentially many versions in order to load and execute the assembly's code. Typically, a dynamically linked library (DLL) in the application's process (e.g., LoadLibrary in kernel32.dll) will use LPC to call into an operating system helper process (e.g., csrss.exe). Part of the data marshaled into the helper process is the token of the originating process. Side-by-side code executing in a thread of the helper process uses the token to impersonate the user process and open the appropriate directory for the helper process's own processing. Using impersonation ensures that when acting on behalf of the application, the helper process's thread has no further security privileges than the application itself, so that the system remains secure.

In some embodiments, the helper process file open request then enters a redirection filter driver. Typically, the redirection filter driver cannot determine what process the request originates from because it cannot ascertain the originating process of the request. Take the example where the user has more than one virtual application running. In this case, one virtual application may have the folder "c:\windows\winsxs\filedir1" in its virtual name space, but another virtual application may not have the folder. The first application should be able to see the folder, but the second should not.

The virtualization system described herein solves this problem by adding additional data to process tokens (i.e., annotating the tokens) that includes an identifier that allows other virtualization components to recognize and locate the correct virtual application environment and data. By being able to locate the correct virtual application environment, other virtualization components can satisfy the resource requests using the correct application storage location (i.e., the components know where to obtain the requested items even if a different path is used in the request). This allows the application as well as operating system helper processes to find the resources to run the virtualized application correctly.

FIG. 1 is a block diagram that illustrates components of the virtualization system, in one embodiment. The system 100 includes an application virtualization environment 110, a detect process creation component 120, a token annotation component 130, a receive resource request component 140, an access annotated token component 150, and a redirect resource request component 160. Each of these components is described in further detail herein.

The application virtualization environment 110 provides a level of indirection between the virtual application and the host operating system. The indirection may be very thin allowing the application to run nearly natively, such as when the application is designed to run on the host operating system (but perhaps storing resources at a different than usual location). Alternatively or additionally, the indirection may provide APIs and satisfy other constraints expected by applications designed for other operating systems or operating system versions. Thus, the application virtualization environment 110 provides a virtual application with the environment for which the application was designed using the available resources of the host operating system. The environment may allow, for example, the host operating system to isolate an application that is vulnerable to viruses or has software defects.

The detect process creation component 120 registers for and receives notification when the host operating system creates a new process. Most applications execute by calling a process creating API provided by an operating system that sets up an environment and data associated with an initial process thread. Such APIs typically then call into kernel mode to allow the operating system to set up data structures that track the state and other information associated with the new process. Operating systems may provide APIs for hooking various stages of this process, so that interested components can receive notification when the operating system creates a new process. The detect process creation component 120 registers for this notification and is called when a new process is created. The component 120 identifies a token associated with the new process, and if the process is associated with a virtualized application the component 120 invokes the token annotation component 130 to add additional information to the virtual process's token.

The token annotation component 130 adds one or more fields of data to a token associated with a virtual process that identify the process as a virtual process and associate the process with a particular virtual environment. Other components can use this information as the process executes to respond correctly to requests to access data stored within the virtual environment. For example, the system 100 may access a registry key or file from the virtual environment based on the process token rather than from the registry or file store associated with the host operating system.

The receive resource request component 140 receives requests from one or more applications to access resources managed by the host operating system. Resources can include files, registry keys, and so forth. The receive resource request component 140 may include user or kernel mode components for receiving or intercepting resource requests from applications. The component 140 may also receive requests from other applications associated with the host operating system (e.g., a helper process) that act on behalf of multiple applications, including the virtual application. The receive resource request component 140 invokes the access annotated token component 150 to determine whether a process is that of or acting on behalf of a virtual application and determine other information about the application. For example, a thread of an operating system helper process (e.g., csrss.exe) may impersonate application virtual process that calls it to perform one or more resource requests.

The access annotated token component 150 accesses the token of the virtual process and reads the fields associated with the virtualization system 100. For example, the fields may correspond to those added by the token annotation component 130. The fields may include information that can be used to identify the virtual environment to which the originating virtual process belongs.

The redirect resource request component 160 receives the information accessed from the process token and redirects resource requests from a physical path to a virtual path. For example, a virtual application may attempt to access a file using the typical operating system path c:\windows\system32\foo.dll, and the redirect resource request component may change the path to another location where data for the application is stored, such as Q:\apps\vfs\system\foo.dll. The operating system provides APIs and other facilities for accessing resources, such as through opening files, but virtualized applications may involve asking the operating system to access a resource at a location other than the location embedded in a request. In addition, virtualized applications may include additional steps, such as decompressing virtualized application data from a packaged format or downloading virtualized application data from a remote location to a local host computer.

In some embodiments, the components of the virtualization system may be implemented within operating system drivers. For example, an annotation driver may include the detect process creation component 120 and the token annotation component 130. As another example, a redirection driver may include the receive resource request component 140, access annotated token component 150, and redirect resource request component 160. Due to variations within operating systems and for performance and other reasons, the virtualization system may be implemented in many different ways, having components of similar function to those described.

The computing device on which the virtualization system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
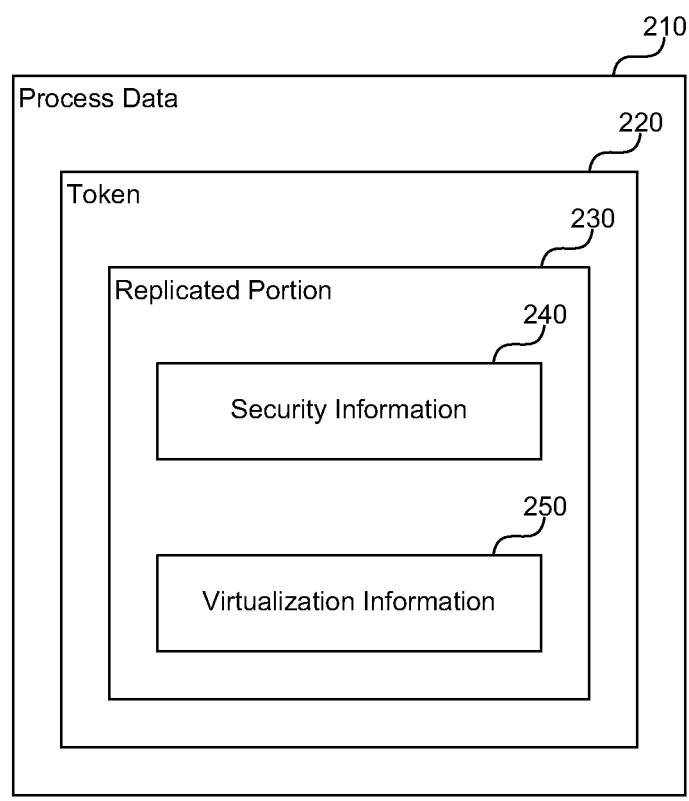
FIG. 2 is a data structure diagram that illustrates data associated with a process running on a host computer, in one embodiment.

FIG. 2 is a data structure diagram that illustrates data associated with a process running on a host computer, in one embodiment. A typical operating system creates process data 210 for each process managed by the operating system. The process data 210 includes information, such as a token 220 containing security information, that stores state and other information about the process. The operating system may access the token 220 at various times during the lifetime of the process to facilitate access to resources and maintain security of the host computer. Processes often spawn other processes, and the token 220 contains a replicated portion 230 that child processes created by an original process inherit.

In addition, operating systems often allow threads within a process to impersonate a particular user or other thread so that the thread inherits the security and other characteristics of the impersonated entity. Impersonation may copy the replicated portion 230 similar to the inheritance of child processes. The replicated portion 230 includes security information 240 such as ACLs and SIDs associated with the token that define the identity of the token holder and the resources that the token holder is permitted to access. The virtualization system annotates the process token to include additional virtualization information 250 within the replicated portion 230 of the token. The virtualization information 250 specifies information useful for correctly identifying a virtual environment on a host operating system of the host computer. Because the virtualization information 250 is within the replicated portion 230, the information 250 is available to child processes and processes or threads impersonating the original process.

Figure 3:
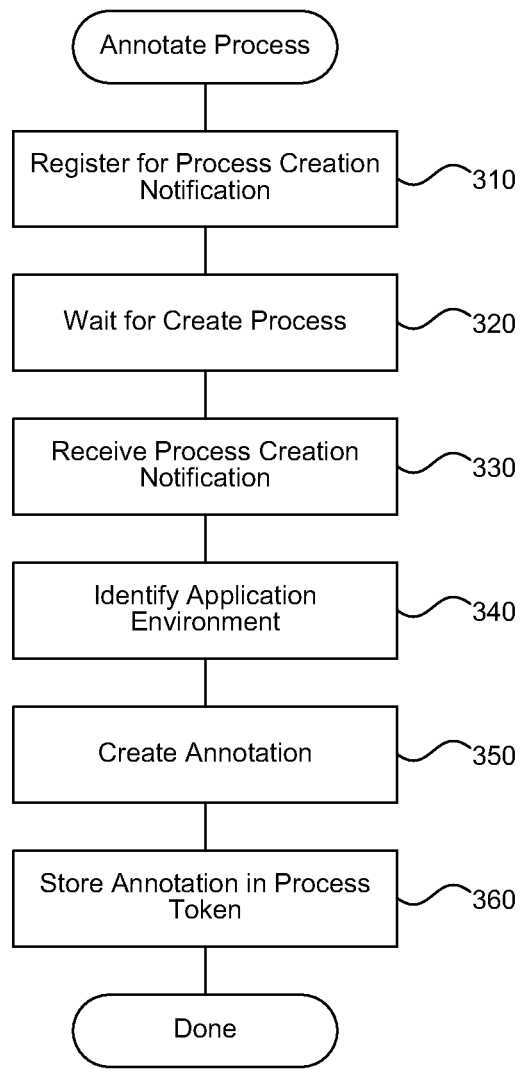
FIG. 3 is a flow diagram that illustrates the processing of the system to annotate a process token with virtualization information, in one embodiment.

FIG. 3 is a flow diagram that illustrates the processing of the virtualization system to annotate a process token with virtualization information, in one embodiment. Every process has a token, and when a process creates a thread or another process, the new thread or process inherits the token. Beginning in block 310, the virtualization system registers for an operating system provided callback that is issued in response to the operating system creating a process. For example, the virtualization system may call an API provided by the operating system through which the virtualization system can register a callback function for the operating system to call. Continuing in block 320, the virtualization system waits for the operating system to notify the virtualization system that a process has been created.

Continuing in block 330, the virtualization system receives a process creation notification. For example, the operating system may call a notification callback function registered by the virtualization system and provide a handle, a process identifier (PID), or other information to the new process. Continuing in block 340, the virtualization system identifies the application environment of the new process. The virtualization system determines whether the process is a virtualized application process. For example, an orchestration service or simply the application's image location may inform the virtualization system that the process is a virtualized application process. Continuing in block 350, the virtualization system creates a custom SID, an identifier, or other form of annotation. For example, the token may include a list of SIDs or other security information associated with the process, and the virtualization system may create a custom SID that rather than a user identifies the process as a virtualized application process within a specific virtual environment.

Continuing in block 360, the virtualization system stores the annotation in the process token. For example, the system may add a custom SID to the list of SIDs associated with the process token. Because the operating system automatically replicates the replicated portion of a process token when the process creates new threads or processes, information placed there will carry forward to children and impersonators of the virtualized application process. After block 360, these steps conclude.

As a virtual process runs, the process may perform an opaque-LPC request. The virtual process packages up the data to communicate to a helper process, including the token for the process or thread, and sends the data to the helper process. The helper process may be a trusted operating system process that has access to most resources on the system. In order to prevent a user process's resource request from compromising the system, the helper process impersonates the originating process token before accessing resources. The impersonation generates a new effective thread token that includes the same custom SID or other form of identifier that is duplicated from the passed-in originating process token.

Figure 4:
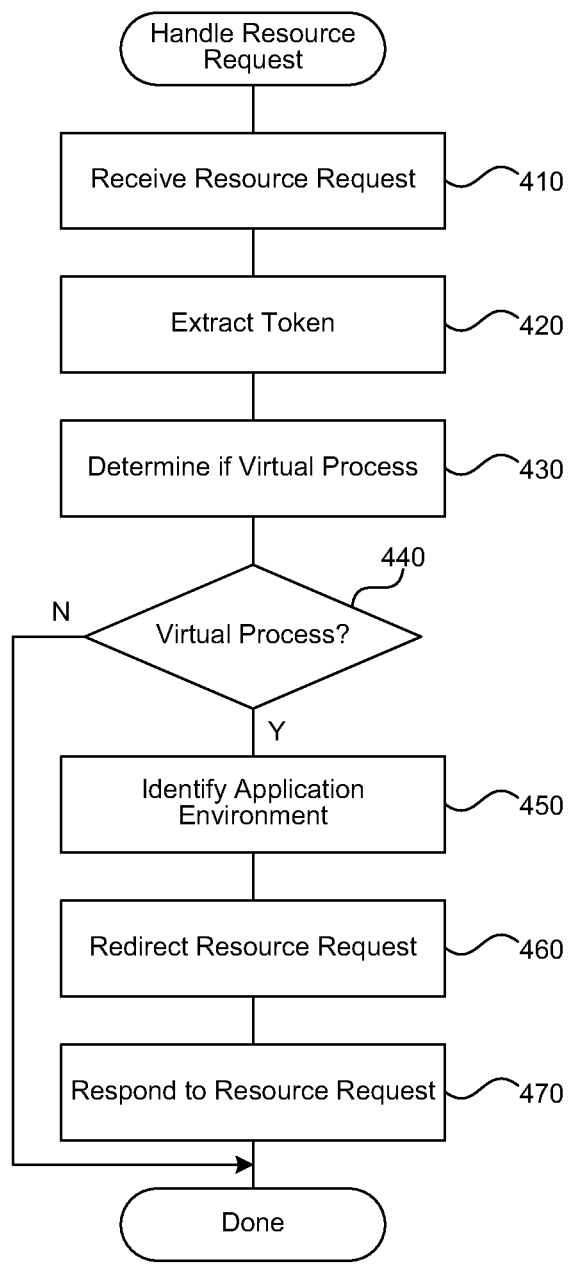
FIG. 4 is a flow diagram that illustrates the processing of the virtualization system to respond to a request to access a resource, in one embodiment.

FIG. 4 is a flow diagram that illustrates the processing of the virtualization system to respond to a request to access a resource, in one embodiment. Beginning in block 410, the virtualization system receives a resource access request. For example, an application may call a file open API provided by the operating system and specify a path to a file that the application requests to open. The operating system may transfer control from the API to kernel mode, where the operating system kernel and filter drivers receive the request. For example, the operating system may include a redirection driver designed to modify paths in requests from virtualized applications to point to a correct virtualized resource storage location.

Continuing in block 420, the virtualization system extracts the token from the process from which the request was received. For example, the operating system may provide an API for accessing data fields of the token, or the data fields may be stored in a well-known data structure inside the token that the virtualization system can locate and access directly. Continuing in block 430, the virtualization system determines whether the extracted data fields of the token indicates a virtual process. For example, the system may look for the custom SID or other form of annotation information created with reference to the steps of FIG. 3. Continuing in decision block 440, if the virtualization system determined that the process is a virtual process, then the system continues at block 450, else the system completes and allows the operating system to respond to the resource request in a normal manner.

Continuing in block 450, the virtualization system identifies a virtual application environment associated with the virtual process. For example, the system may query an annotation driver to determine which virtual process the custom SID extracted from the process token is associated with. Continuing in block 460, the virtualization system redirects the request to the identified virtual application environment. For example, a redirection driver may receive information identifying the virtual application environment from the annotation driver. The redirection driver modifies the received request to point to the resources associated with the virtual application. For example, the redirection driver may modify a file path contained in the received request with a file path associated with the virtual application.

Continuing in block 470, the operating system responds to the redirected resource request by providing access to the requested resource. For example, the operating system may open an identified file and provide the file data in response to the request. The application behaves as if the data is where the application normally stores it and the virtualization system modifies requests to point to the location where the data is actually stored. Because of the token annotation performed by the virtualization system, the application virtualization works correctly whether the resource request comes from the application, a helper process operating on behalf of the application, or other sources. After block 470, these steps conclude.

In some embodiments, the virtualization system stores application data in a package file format. A package file can be any file format capable of storing multiple other files and types of data. For example, common existing package file formats include ZIP, CAB, RAR, SFT, and other similar formats. Package files often include compression for reducing file size and other features (e.g., encryption) in addition to allowing multiple files to be stored in one archive format. A package file for a virtualized application may include registry hives, files, databases, and other types of data that are used by the virtual application. The operating system may mount the package files like a directory, a volume, a disk drive, or other resource so that the virtual application can reference the items stored within the package file using common operating system APIs for file and other resource manipulation. In some embodiments, the virtualization system may include virtual application data in the executable of the virtual application, so that the application can be distributed as a single EXE file with self-extracting data. Although several examples are described here, the virtualization system is not limited to any particular manner of storing application data, and storage mechanisms other than those described can be used.

In some embodiments, the virtualization system provides kernel-mode components to modify operating system behavior. Past attempts at application virtualization often involve user-mode hooks and interception techniques that have limited success at detecting all of the actions that a virtual application may attempt. The virtualization system may include kernel-mode drivers, as described further herein, that allow the system to more comprehensively detect actions by or on behalf of the virtual process, and to modify those actions more efficiently. For example, a kernel-mode redirection driver that detects the annotated token described herein can more easily detect that a resource request is associated with a particular virtual environment (even when made by a process other than a virtual process), and can modify the path in the resource request to point to virtual resources at their correct location. Kernel-mode operation provides detection of activity that spans processes and is often more efficient than user-mode modification that may involve multiple user-to-kernel mode transitions.

From the foregoing, it will be appreciated that specific embodiments of the virtualization system have been described herein for purposes of illustration, but that various modifications may be made without deviating from the spirit and scope of the invention. For example, virtual processes may include any type of application that normally runs on a computer system. The application in many cases is not even aware that it is running in a virtualized manner. Administrators may have many reasons for running applications virtually, including security isolation, well-defined data partitioning, allowing complex applications to run in a confined space like a USB drive, and so forth. Accordingly, the invention is not limited except as by the appended claims.

We claim:

1. A computer-implemented method for executing virtual applications within a host operating system, the method comprising:
    providing at least some indirection between the virtual application and the host operating system through an application virtualization environment;
    registering for and receiving notification in response to the host operating system creating a new process;
    identifying a token associated with the new process;
    adding one or more fields of data to the token that identify the process as a virtual process and associate the process with a particular virtual environment by adding the one or more fields of data to a portion of the token that the host operating system automatically replicates to related processes of the virtual process;
    receiving requests from one or more applications to access resources managed by the host operating system, wherein one type of request originates from an operating system process acting on behalf of the virtual process, the operating system process is a separate process from the virtual process;
    accessing the token of an execution context and read the one or more fields of data added to identify virtualization information including identification of the particular virtual environment associated with the virtual process; and
    receiving the virtualization information accessed from the token including identification of the particular virtual environment associated with the virtual process and based upon the identification of the particular virtual environment associated with the virtual process, redirecting resource requests from a specified location to a virtual location, including redirecting requests originating from the operating system process acting on behalf of the virtual process to the particular virtual environment associated with the virtual process,
    wherein the one or more fields of data are added to the token if the process is associated with a virtual application environment and
    the preceding steps are performed by at least one processor.

2. The method of claim 1 wherein an executing process impersonates the virtual process and copies information from a token associated with the virtual process.

3. The method of claim 1 wherein the received request specifies a path and redirecting the request comprises modifying the specified path to reference a location where the requested resource associated with the virtual process is stored.

4. The method of claim 1 wherein receiving the resource access request comprises invoking a kernel-mode redirection driver configured to determine whether the request originates from a virtual process and if so, modify paths in requests from virtualized applications to point to a correct resource storage location.

5. The method of claim 1 further comprising extracting process information comprising a token that includes security information related to the virtual process.

6. The method of claim 5 further comprising determining whether the extracted process information indicates a virtual process comprising identifying a form of annotation stored within the extracted process information.

7. The method of claim 5 further comprising identifying a virtual environment associated with the virtual process comprising querying an annotation driver to determine the virtual process associated with the process information extracted from the executing process.

8. The method of claim 1 wherein an executing process from which the request was received is a helper process acting on behalf of a separate virtual process.

9. The method of claim 1 wherein redirecting the received request to the particular virtual environment comprises invoking a redirection driver to modify the received request to point to resources associated with the virtual process.

10. The method of claim 1 further comprising responding to the redirected resource request comprising opening an identified file and providing the file data in response to the request.

11. A computer system for executing virtual applications within a host operating system, the computer system comprising:
    at least one processor and a memory comprising software instructions stored thereon that when executed by the at least one processor cause the at least one processor to implement components, the components comprising:
    an application virtualization environment configured to provide at least some indirection between the virtual application and the host operating system;
    a detect process creation component configured to register for and receive notification in response to the host operating system creating a new process;
    a token annotation component configured to add one or more fields of data to a token associated with a virtual process that identify the process as a virtual process and associate the process with a particular virtual environment;
    a receive resource request component configured to receive requests from one or more applications to access resources managed by the host operating system, wherein one type of request originates from an operating system process acting on behalf of the virtual process, the operating system process is a separate process from the virtual process;

an access annotated token component configured to access the token of an execution context and read the one or more fields of data added by the token annotation component to identify virtualization information including identification of the particular virtual environment associated with the virtual process; and a redirect resource request component configured to receive the virtualization information accessed from the token including identification of the particular virtual environment associated with the virtual process and based upon the identification of the particular virtual environment associated with the virtual process, redirect resource requests from a specified location to a virtual location, wherein the redirect resource request component redirects requests originating from the operating system process acting on behalf of the virtual process to the particular virtual environment associated with the virtual process, wherein the detect process creation component is further configured to identify a token associated with the new process, and if the process is associated with a virtual application environment, invoke the token annotation component to add the one or more fields of data to the virtual process token, and, wherein the token annotation component is further configured to add the one or more fields of data to a portion of the token that the host operating system automatically replicates to related processes of the virtual process.

12. The system of claim 11 wherein the application virtualization environment is further configured to provide the application with an environment for which the application was designed using the available resources of the host operating system, wherein the environment differs from a native environment of the host operating system.

13. The system of claim 11 wherein the receive resource request component is further configured to receive requests from one or more helper applications operating on behalf of another application to access resources managed by the host operating system.

14. A computer memory comprising instructions for executing virtual applications within a host operating system, wherein the instructions, when executed, cause at least one processor to perform actions comprising:

providing at least some indirection between the virtual application and the host operating system through an application virtualization environment;

registering for and receiving notification in response to the host operating system creating a new process;

identifying a token associated with the new process;

adding one or more fields of data to the token that identify the process as a virtual process and associate the process with a particular virtual environment by adding the one or more fields of data to a portion of the token that the host operating system automatically replicates to related processes of the virtual process;

receiving requests from one or more applications to access resources managed by the host operating system, wherein one type of request originates from an operating system process acting on behalf of the virtual process, the operating system process is a separate process from the virtual process;

accessing the token of an execution context and read the one or more fields of data added to identify virtualization information including identification of the particular virtual environment associated with the virtual process; and receiving the virtualization information accessed from the token including identification of the particular virtual environment associated with the virtual process and based upon the identification of the particular virtual environment associated with the virtual process, redirecting resource requests from a specified location to a virtual location, including redirecting requests originating from the operating system process acting on behalf of the virtual process to the particular virtual environment associated with the virtual process, wherein the one or more fields of data are added to the token if the process is associated with a virtual application environment.

15. The computer memory of claim 14 further comprising determining whether a newly created process is associated with the application virtualization environment by determining an image location associated with the newly created process.

16. The computer memory of claim 14 wherein the virtualization information comprises an identifier.

17. The computer memory of claim 14 further comprising storing the virtualization information in a portion of the process token that the operating system associates with at least some new threads or processes related to and impersonators of a newly created process.

* * * * *